United States Patent
Lilge et al.

[11] Patent Number: 6,154,282
[45] Date of Patent: Nov. 28, 2000

[54] SEMICONDUCTOR BASED EXCITATION ILLUMINATOR FOR FLUORESCENCE AND PHOSPHORESCENCE MICROSCOPY

[75] Inventors: Lothar Lilge; Peter S. Pennefather; Stephen M. Ross, all of Toronto, Canada; Cha-Min Tang, Radnor, Pa.; Kai Zhang, Toronto, Canada

[73] Assignee: Cytotelesis Inc., Toronto

[21] Appl. No.: 09/374,535

[22] Filed: Aug. 16, 1999

Related U.S. Application Data

[60] Provisional application No. 60/105,621, Oct. 26, 1998.
[51] Int. Cl.[7] ...................................................... G01N 21/64
[52] U.S. Cl. .......................... 356/417; 356/317; 356/318; 250/458.1; 250/461.1
[58] Field of Search ..................................... 356/317, 318, 356/417; 250/458.1, 459.1, 461.1, 461.2

[56] References Cited

U.S. PATENT DOCUMENTS

| | | |
|---|---|---|
| 4,643,550 | 2/1987 | Kitagawa et al. . |
| 4,852,985 | 8/1989 | Fujihara et al. . |
| 5,489,771 | 2/1996 | Beach et al. . |
| 5,736,410 | 4/1998 | Zarling et al. ........................... 356/244 |

*Primary Examiner*—F. L. Evans
*Attorney, Agent, or Firm*—Bereskin & Parr

[57] ABSTRACT

Apparatus for exciting a fluorescent or phosphorescent molecule applied to a specimen in a microscope, the molecule having a known excitation wavelength, comprises a semiconductor light source capable of emitting an output light within a preselected wavelength band correlated with the excitation wavelength of the molecule, an electronic controller coupled to the light source for controlling the intensity of the output light, and an optical system for converting the output light into an excitation beam having a preselected distribution of light flux suitable for illuminating the specimen. The semiconductor light source is preferably a light emitting diode or superluminescent diode. The subject invention provides for a fluorescence excitation illuminator having a long lifetime and relatively low cost. Intensity modulation or attenuation can be achieved electronically, without the need for shutters.

20 Claims, 5 Drawing Sheets

SEMICONDUCTOR BASED EXCITATION ILLUMINATOR FOR FLUORESCENCE AND PHOSPHORESCENCE MICROSCOPY

This application claims the benefit of U.S. Provisional Application Ser. No. 60/105,621, filed on Oct. 26, 1998 and entitled A Semiconductor Based Excitation Illuminator for Fluorescence Microscopy.

FIELD OF THE INVENTION

This invention relates to fluorescence microscopy systems, and in particular, to light sources for exciting fluorescent and phosphorescent molecules.

BACKGROUND OF THE INVENTION

Most epifluorescence microscopy systems use arc lamp or incandescent halogen lamp illuminators to produce light for sample excitation. Arc lamps have the disadvantage of short lifespan and high expense. Certain applications of fluorescence microscopy require rapid on-off switching of the epifluorescence illumination. However, arc lamps cannot be quickly turned on and off, due to significant warm-up and cool-down periods and because of the risk of electrode damage in some types of arc lamps. They are therefore limited in their ability to monitor rapid responses to changes in excitation. Such lamps also take several minutes to produce a stable, constant light output as they warm up.

Some manufacturers have produced fluorescence excitation illuminators that make use of incandescent halogen lamps, but these lamps do not produce ultraviolet light required to excite certain fluorescent dyes. Also, halogen lamps cannot be rapidly turned on and off due to significant warm-up and cool-down periods. Both arc lamps and incandescent lamps require external shutters to rapidly expose the dye to light and cut the exposure off, and various mechanical means are required to direct the excitation light alternately through one wavelength selector device, then another. These mechanical devices cause vibration and timing problems.

Prior art illuminators have some additional limitations and disadvantages. They require high power transformers and draw large amounts of current, which limits their usefulness in portable or mobile applications. For incandescent halogen lamps, UV output is limited. Electromagnetic interference is generated during turn on (ignition) of arc lamps. Prior art arc lamps often produce more light than is necessary, which requires neutral density filters to attenuate unnecessary light output. Light output from arc lamps cannot be modulated, and modulating the output of halogen lamps results in a nonlinear shifting of colour temperature. Large fluxes of heat are produced (25–300 Joule/second) which must be removed, either by means of airflow or waterflow, and airflow cooling can lead to temperature fluctuations at the light source that cause spectral fluctuations in arc lamp or incandescent lamp output. Heat production also means that a heat filter must be used to prevent infrared light from saturating video cameras or other light-detecting elements. Excessive heat production prevents placing heat-sensitive optical elements such as bandpass filters close to the arc lamp or halogen lamp. Sometimes, enough heat is produced to cause significant heating of the rooms in which traditional light sources are located, requiring increased airflow, or addition of air conditioning. There are also safety concerns with arc lamps, including bulb explosion, burns caused contacting hot elements, and ozone production.

Laser light sources have been used for fluorescence microscopy, but the narrow, collimated beam of a laser requires scanning of the light source repetitively across the sample specimen within the field of view of the microscope. There are also speckling artifacts and out-of-plane-of-focus image artifacts associated with laser light sources for fluorescence microscopy. Laser light sources are also relatively expensive.

There is accordingly a need for a light source for exciting fluorescent and phosphorescent molecules via epifluorescence which is less expensive than current fluorescence illuminators, which has lower intrinsic fluctuations (noise), which lasts for a much longer time, and which can be rapidly switched on and off, thereby obviating the need for shutters, optical choppers, optical filter changing devices, and the like. Rapid modulation of intensity would also allow for adaption of intensity for optimizing the fluorescent signal and also permit a number of spectroscopic applications such as fluorescence life-time analysis that currently require more expensive laser light sources, and phosphorescence lifetime analysis that currently requires mechanical shuttering devices.

SUMMARY OF THE INVENTION

The present invention is directed towards apparatus for exciting a fluorescent or phosphorescent molecule of a specimen within a microscope having a field of view, the molecule having a known excitation wavelength, comprising (a) a semiconductor light source capable of emitting an output light within a preselected wavelength band correlated with the excitation wavelength, (b) an electronic controller operationally coupled to the light source for controlling the intensity of the output light, and (c) an optical system for converting the output light into an excitation beam having a pre-selected distribution of light flux suitable for illuminating the specimen.

The semiconductor light source is preferably a light emitting diode or superluminescent diode, which produces a continuous or pulsed or modulated light output. The light system preferably comprises a combination of optical components which deliver a substantially uniform distribution of light flux which covers the entire field of view of the microscope.

DETAILED DESCRIPTION OF THE PREFERRED EMBODIMENTS

Figure 1:
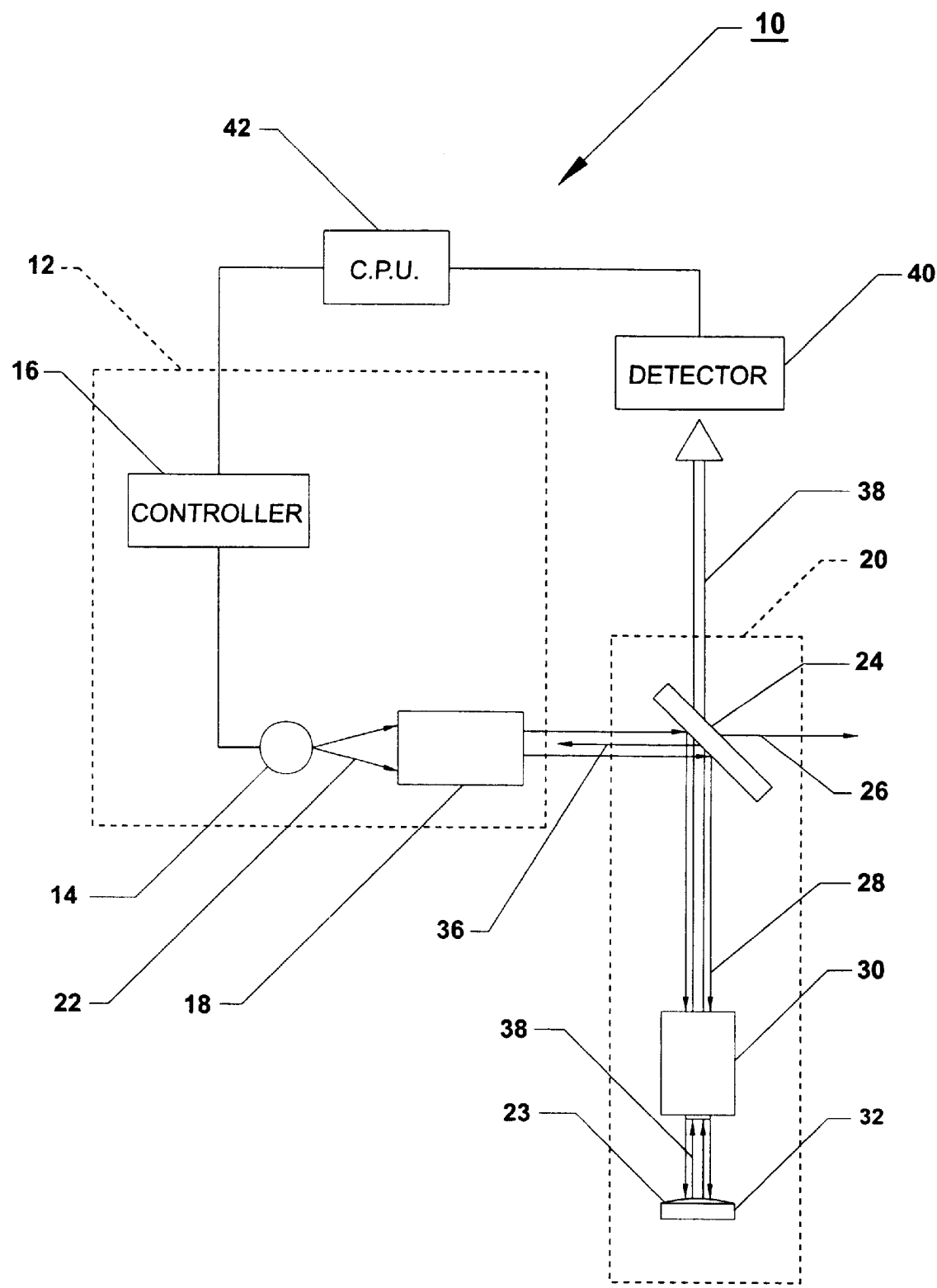
FIG. 1 is a schematic diagram of a fluorescence microscopy system incorporating a preferred embodiment of the subject invention.

FIG. 1 illustrates a fluorescent microscopy system 10 incorporating fluorescent dye excitation apparatus 12, made in accordance with a preferred embodiment of the subject invention. Dye excitation apparatus 12 comprises a semiconductor light source 14, an electronic controller 16 for controlling the operation of semiconductor light source 14, and an optical system 18. Semiconductor light source 14 emits output light 22, which is converted by optical system 18 into an excitation beam 28 having a distribution of light flux suitable for simultaneously illuminating substantially all of the field of view of microscope 20. Dichroic mirror 24 within microscope 20 reflects excitation beam 28 onto objective lens 30 of microscope 20. Any light 26 above the pre-selected wavelength passes through dichroic mirror 24. Objective lens 30 focuses excitation beam 28 onto specimen 32, containing fluorescent dye 23. Specimen 32 then fluoresces, and emits imaging light 38, which passes through dichroic mirror 24 and is detected by detector 40. Any scattered and reflected light 36 below a cutoff frequency is reflected by dichroic mirror 24. CPU 42 processes the output of detector 40, and interfaces with electronic controller 16.

Figure 2:
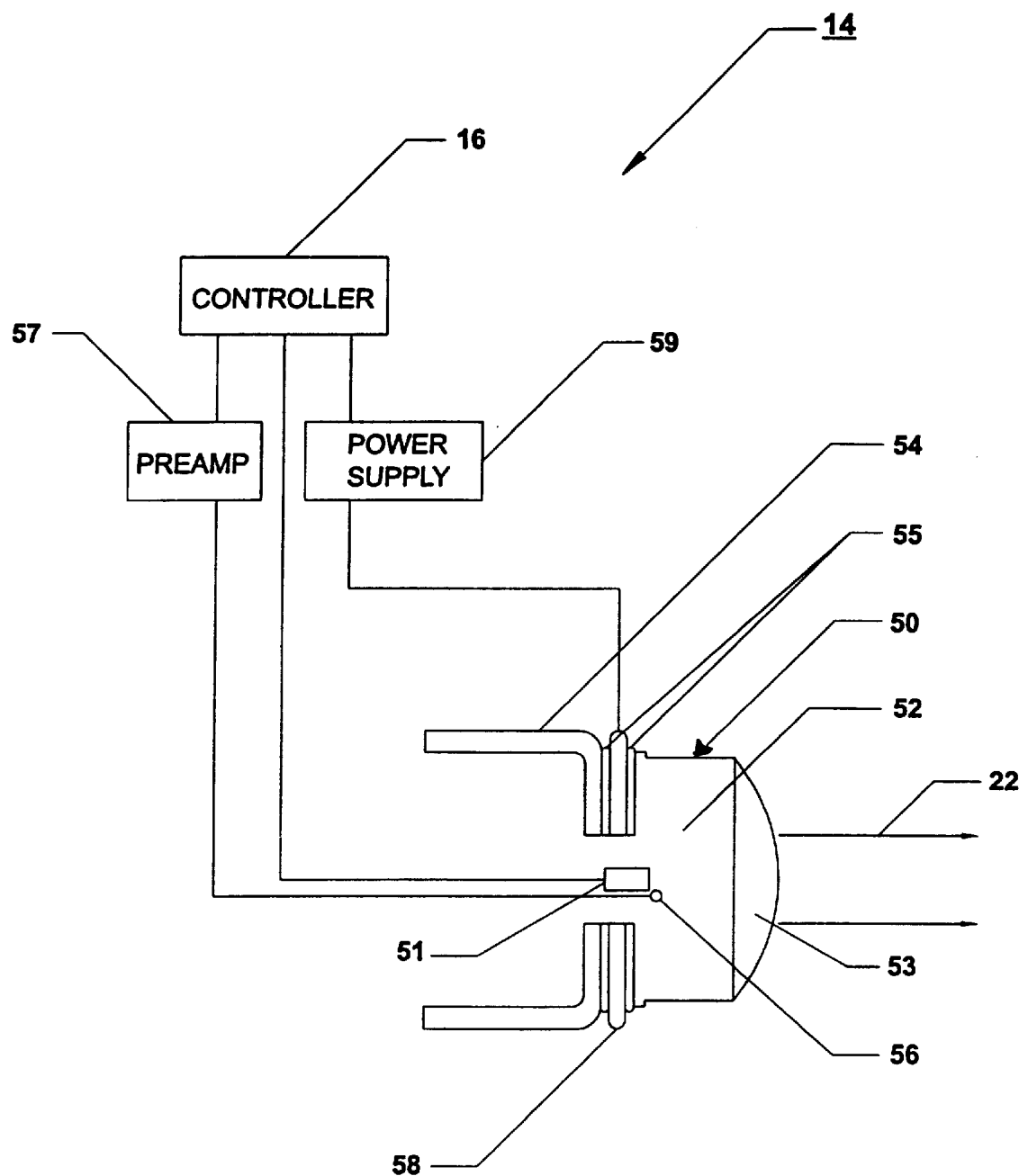
FIG. 2 is a schematic diagram of a preferred embodiment of the semiconductor light source of the subject invention.

Referring now to FIG. 2, semiconductor light source 14 preferably comprises a light emitting diode (LED) 50 which emits a non-coherent output light 22 having a wavelength correlated with the excitation wavelength of the fluorescent dye applied to the specimen. LED 50 comprises a semiconductor chip 51 encased in a polymer LED body 52, having a clear front lensing surface 53. LED body 52 is affixed to heat sink 54 by heat sink compound 55. LED 50 preferably includes thermocouple 56 for measuring the temperature of semiconductor chip 51, which is connected to preamp 57. LED 50 optionally includes an active constant temperature control system, comprising Peltier Junction Wafer 58 coupled to Peltier Junction power supply 59, which acts to cool LED 50. Semiconductor chip 52, preamp 57 and power supply 59 are electrically connected to controller 16.

LED 50 preferably emits a relatively monochromatic output light 22 having wavelengths within a narrow band around its nominal wavelength. The power output of LED 50 must be sufficient to excite a given fluorescent molecule. Surprisingly, inventors have found that commercially available LEDs having a power output falling in the range of about ½ mW to about 1–½ mW are capable of exciting fluorescent molecules used for fluorescence microscopy. For example, a 1 mW LED having a 473 nm emission wavelength, manufactured by Hewlett Packard, is capable of exciting a fluorescent dye having a 485 nm excitation wavelength. Since commercially available diodes tend to have high NA (numerical aperture), output light 22 tends to diverge rapidly, notwithstanding lensing surface 53.

Figure 3:
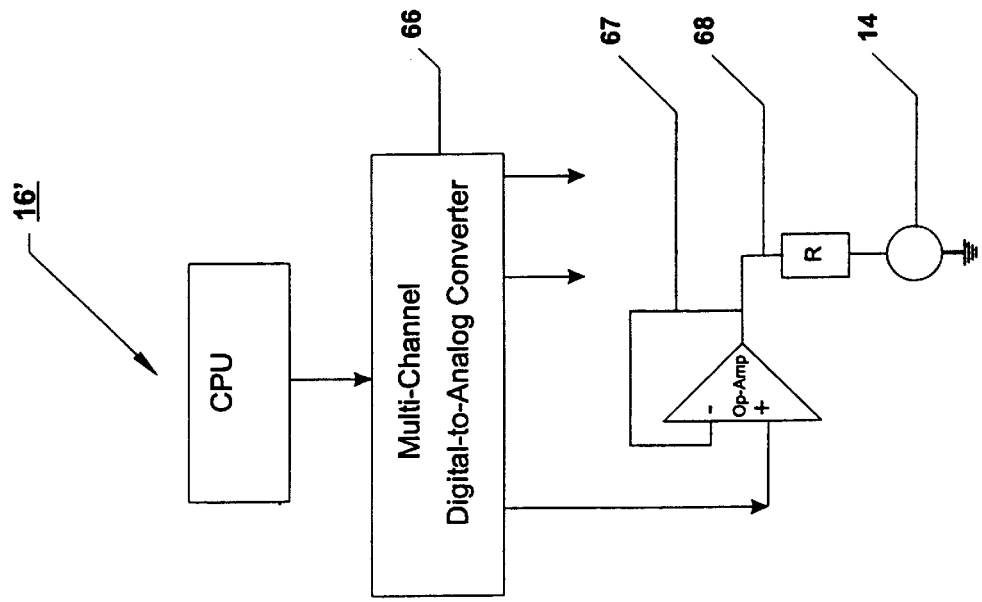
FIG. 3a is a schematic diagram of a preferred embodiment of the electronic controller of the subject invention.
FIG. 3b is a schematic diagram of an alternative embodiment of the subject controller.
Figure 3:
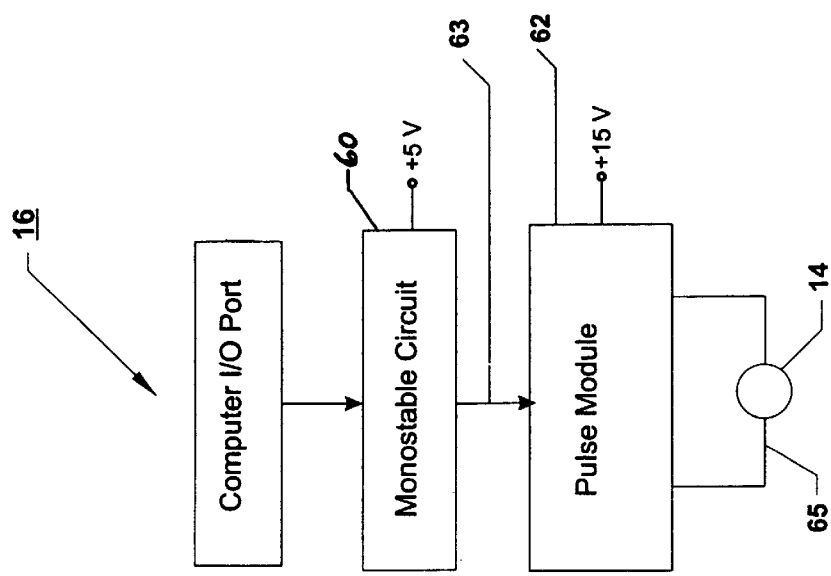

As shown in FIG. 3a, electronic controller 16 may comprise a power source circuit 60 coupled to CPU 20 and a pulse module 62. Power source circuit 60 produces voltage signal 63 which is input into pulse module 62. Pulse module 62 produces a pulsed input signal 65 which is supplied to semiconductor light source 14. Input signal 65 may comprise a 2–4 ns, 2A pulse. Since the intensity of output excitation light 22 of light source 14 is linearly related to the input current 65, applying a pulsed input current 65 produces a pulsed type of excitation light 22. Alternatively, applying a sinusoidal or other modulated input current will result in an output light 22 having a modulated intensity.

Referring now to FIG. 3b, in an alternative embodiment, electronic controller 16 comprises a multichannel digital-to analog converter 66 to control multiple light sources, possibly of different wavelengths. For each channel, and op-amp 67 supplies a continuous current 68 to light source 14.

Figure 4:
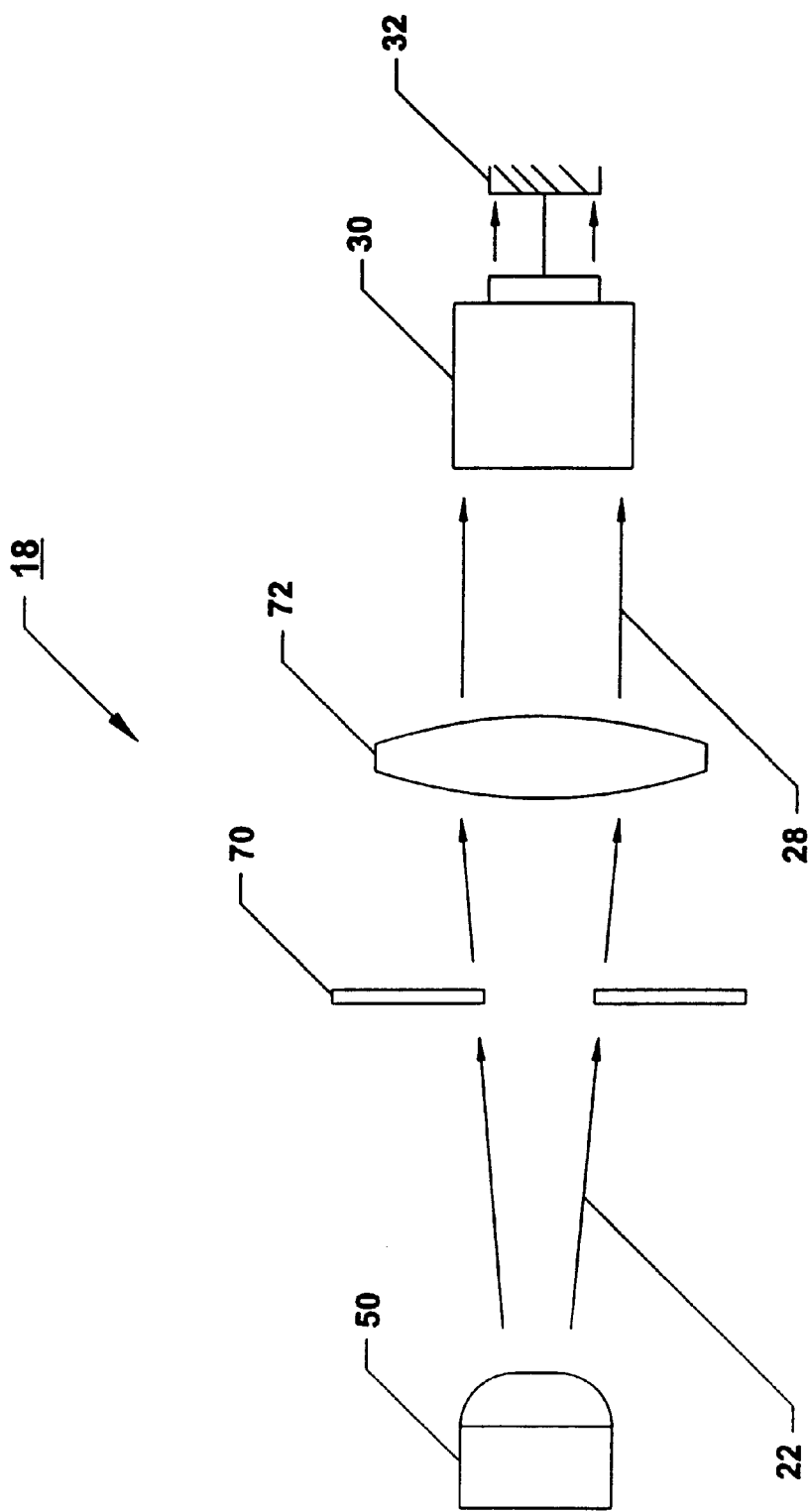
FIG. 4 is a schematic diagram of a preferred embodiment of the optical system of the subject invention.

As shown in FIG. 4, optical system 18 comprises a lens system designed to produce excitation beam 28 which can be focused through objective lens 30 onto specimen 32. In the case of an infinity corrected microscope, excitation beam 28 should preferably be collimated. Preferably, beam 28 has a substantially uniform flux over a preselected area suitable for uniformly illuminating specimen 32. Since the output light 22 from LED 50 tends to be of low intensity and diverging, optical delivery system 18 should be designed to capture and deliver as much of output light 22 as possible to objective lens 30. As shown, optical delivery system 20 comprises diaphragm 70, and a single quartz biconvex lens 72 having a focal length equal to the distance between LED 50 and lens 72, but other types and combinations of lenses, such as telescopic-type systems and fiber optical delivery systems can be used. Optical delivery system 18 may optionally comprise a band pass filter for restricting the output of the light source to a narrow band of wavelengths, or a light sensing element for active control of the excitation light.

Figure 5:
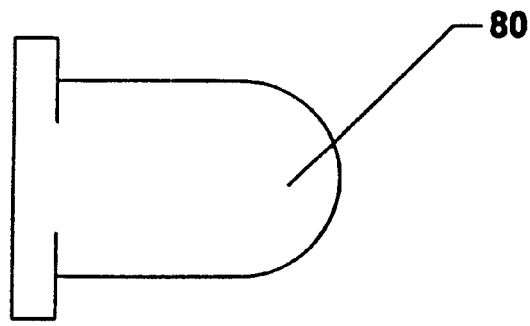
FIG. 5 is a schematic diagram of an alternative embodiment of the semiconductor light source of the subject invention.

Referring now to FIG. 5, light source 14 may alternatively comprise other types of semiconductor sources of noncoherent light, such as super luminescent diode (SLD) 80, which are more powerful and more expensive than LEDs. SLD 80 has a nominal output wavelength of 680 nm, which could be used for red fluorescent dyes excited in the visible red region. Other SLDs emit output light in the infrared region of the spectrum.

Figure 6:
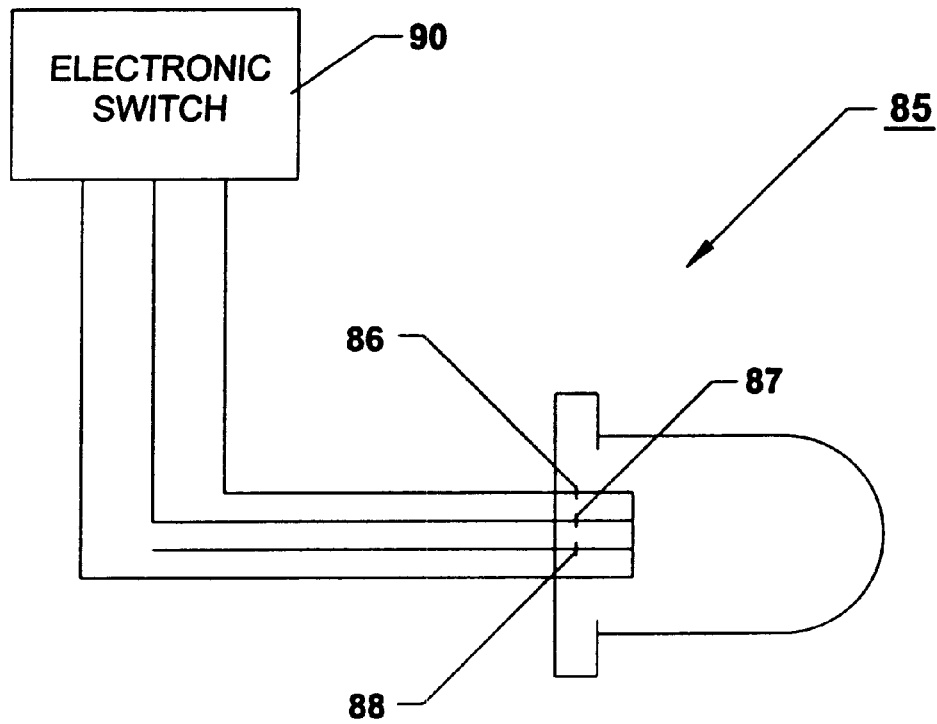
FIG. 6 is a schematic diagram of a further alternative embodiment of the semiconductor light source of the subject invention.

Referring now to FIG. 6, in an alternative embodiment, the subject light source comprises a multi-chip light emitting diode 85. As shown, LED 85 comprises three semiconductor chips 86, 87 and 88 electrically coupled to electronic switch 90, which alternately supplies current to chips 86, 87 and 88. Chips 86, 87 and 88 may emit light at different wavelengths for multiple wavelength excitation, or alternatively, they may emit light at the same wavelength to boost power.

Apparatus 12 of the subject invention can be used with commercially available fluorescence microscopes, by replacing the standard insert tube used with conventional arc or halogen lamps, with the optical delivery system of the subject invention. The subject invention can be used for, but is not limited to the following applications:

Fluorescence microscopy.

Portable fluorescence microscopy.

Multiple-wavelength excitation fluorescence microscopy: it is sometimes desirable to excite multiple fluorescent dyes, either simultaneously, or alternately, by switching between wavelengths.

It is also sometimes desirable in quantitative fluorescence microscopy to alternately excite dyes with different wavelengths of light. The present invention enables this function to be performed at high speed.

Synchronized Excitation and Recording: minimizes photobleaching and enables triggered data sampling, and acquiring separate images or recordings of different fluorescent dyes. Reduction of bleaching is also important because the bleaching process produces free radicals that can damage living specimens.

Fluorescence and phosphorescence lifetime measurements: when a fluorescent or phosphorescent dye becomes excited by absorbing a photon with an optimal wavelength it relaxes back to its resting energy level and emits a new longer wavelength photon. The average life-time of this excited state and thus the average delay between absorbing a photon and emitting a new photon is dependent on the chemical structure of the dye and the environment in which the dye molecule is found. In order to measure fluorescence-life time modulation by the environment in which the dye is found, the excitation light intensity must be changed with a time constant that is faster than the average excited life-time of the dye. This type of measurement can be achieved with the subject LED excitation illuminator.

Fluorescence and Phosphorescence Phase Shifts: because the intensity of the light output of the invention can be modulated in a time-dependent fashion, for example sinusoidal or other time-varying light signals can be delivered and the resulting output analyzed, as described above.

The light source made in accordance with the subject invention has a number of advantages over the prior art. It has a long lifetime and relatively low cost. No electromagnetic interference is generated during turn on and turn off, and there is rapid stabilization of output (intensity/wavelength). The subject light source has fast on-off cycle time with no slewing or hysteresis of light output. Intensity modulation/attenuation can be achieved electronically, and no neutral density filters are required to attenuate light output. Wavelength can be changed electronically with no timing or vibration problems. The subject light source produces much less heat than traditional fluorescence excitation sources for microscopes. The geometry of the light emitting diode can be arranged so that solid-state cooling units can be used to transport the heat from the light emitting diode with no vibration or fluctuation in heat transport. The subject light source can illuminate the entire field of view simultaneously, without the scanning required of laser light sources, and without the speckling and coherence artifacts of laser beams whether or not the laser beam has been optically diverged.

It should be understood that various modifications can be made to the preferred embodiments described and illustrated herein, without departing from the subject invention, the scope of which is defined in the appended claims.

What is claimed is:

1. Apparatus for exciting a fluorescent or phosphorescent molecule of a specimen within a microscope having a field of view, the molecule having a known excitation wavelength, comprising:

(a) a semiconductor light source capable of emitting an output light within a preselected wavelength band correlated with the excitation wavelength;

(b) an electronic controller coupled to the light source for controlling the intensity of the output light; and (c) an optical system for converting the output light into an excitation beam having pre-selected distribution of light flux suitable for simultaneously illuminating the field of view.

2. The apparatus defined in claim 1, wherein the output light of the light beam is diverging.

3. The apparatus defined in claim 1, wherein the optical system comprises a combination of optical components which deliver a substantially uniform distribution of light flux to the field of view.

4. The apparatus defined in claim 1, wherein the molecule is a dye molecule applied to the specimen.

5. The apparatus defined in claim 1, wherein the excitation wavelength of the molecule falls within a range of wavelengths extending from ultraviolet to infrared.

6. The apparatus defined in claim 1, wherein the semiconductor light source is a light emitting diode.

7. The apparatus defined in claim 6, wherein the light emitting diode emits light at a power level greater than about ½ mW.

8. The apparatus defined in claim 1, wherein the electronic controller comprises power means for supplying current, and pulse generating means for generating a pulsed input current to the light source, and the light source produces a pulsed output light.

9. The apparatus defined in claim 8, wherein the pulse generating means generates a pulse having a width in the range of 2–4 ns.

10. The apparatus defined in claim 1, wherein the light source is a super luminescent diode.

11. The apparatus defined in claim 10, wherein the super luminescent diode emits light having an intensity in the 1 to 100 mW range.

12. The apparatus defined in claim 1, wherein the semiconductor light source comprises a light emitting diode having multiple semiconductor chips.

13. The apparatus defined in claim 12, wherein the multiple semiconductor chips emit light of different wavelengths.

14. The apparatus defined in claim 6, wherein the light emitting diode emits light having a nominal wavelength of about 473 nm.

15. The apparatus defined in claim 1, wherein the optical system comprises a light sensing element for active control of excitation light.

16. The apparatus defined in claim 1, wherein the light source comprises a semiconductor chip and temperature sensing means embedded near the semiconductor chip for determining real time measurement of the temperature of the chip.

17. The apparatus defined in claim 1, wherein the optical system comprises a band pass optical filter for restricting the output of the light emitting source to a narrow band of wavelengths.

18. The apparatus defined in claim 6, wherein the semiconductor light source comprises cooling means for cooling the light emitting diode.

19. The apparatus defined in claim 1, wherein the light source produces a modulated light output.

20. Apparatus for exciting a fluorescent or phosphorescent molecule of a specimen within a microscope having a field of view, the molecule having a known excitation wavelength, comprising:

(a) a semiconductor light source capable of emitting an output light within a preselected wavelength band correlated with the excitation wavelength;

(b) an electronic controller coupled to the light source for controlling the intensity of the output light; and (c) an optical system for converting the output light into an excitation beam having pre-selected distribution of light flux suitable for illuminating the field of view.

* * * * *